April 22, 1941.　　　C. A. CADWELL　　　2,238,926
WELDING
Original Filed Oct. 22, 1936　　4 Sheets-Sheet 1
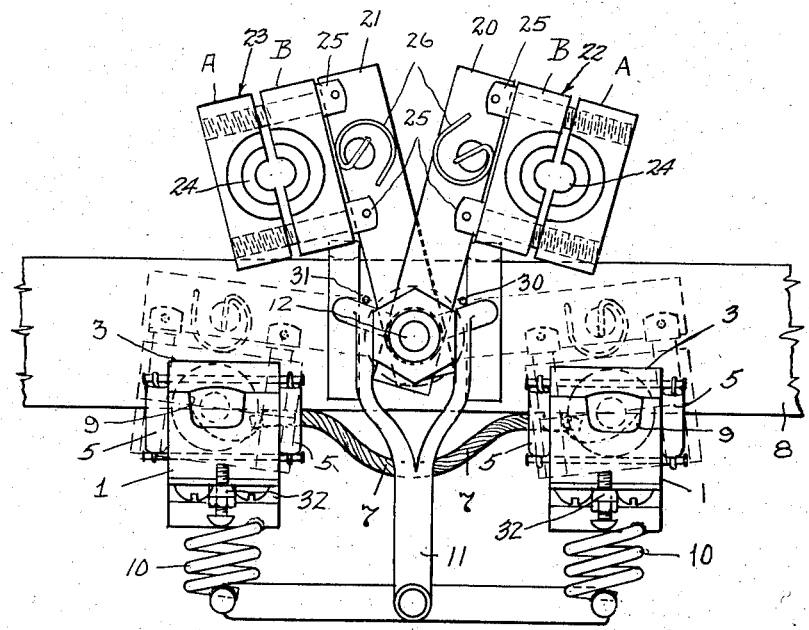
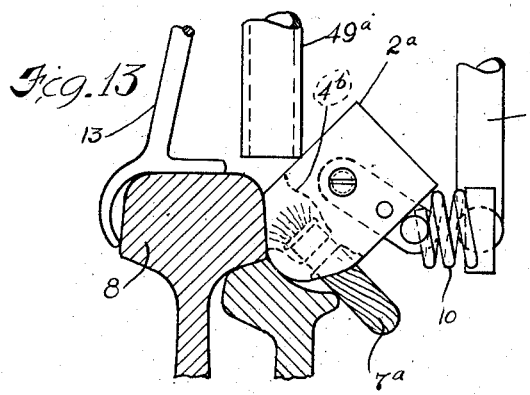
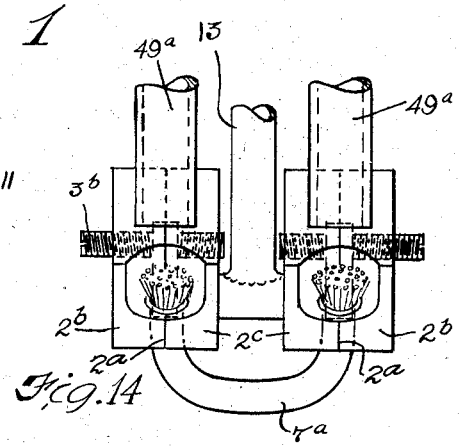
INVENTOR.
Charles A. Cadwell
BY Fay, Oberlin & Fay
ATTORNEYS.

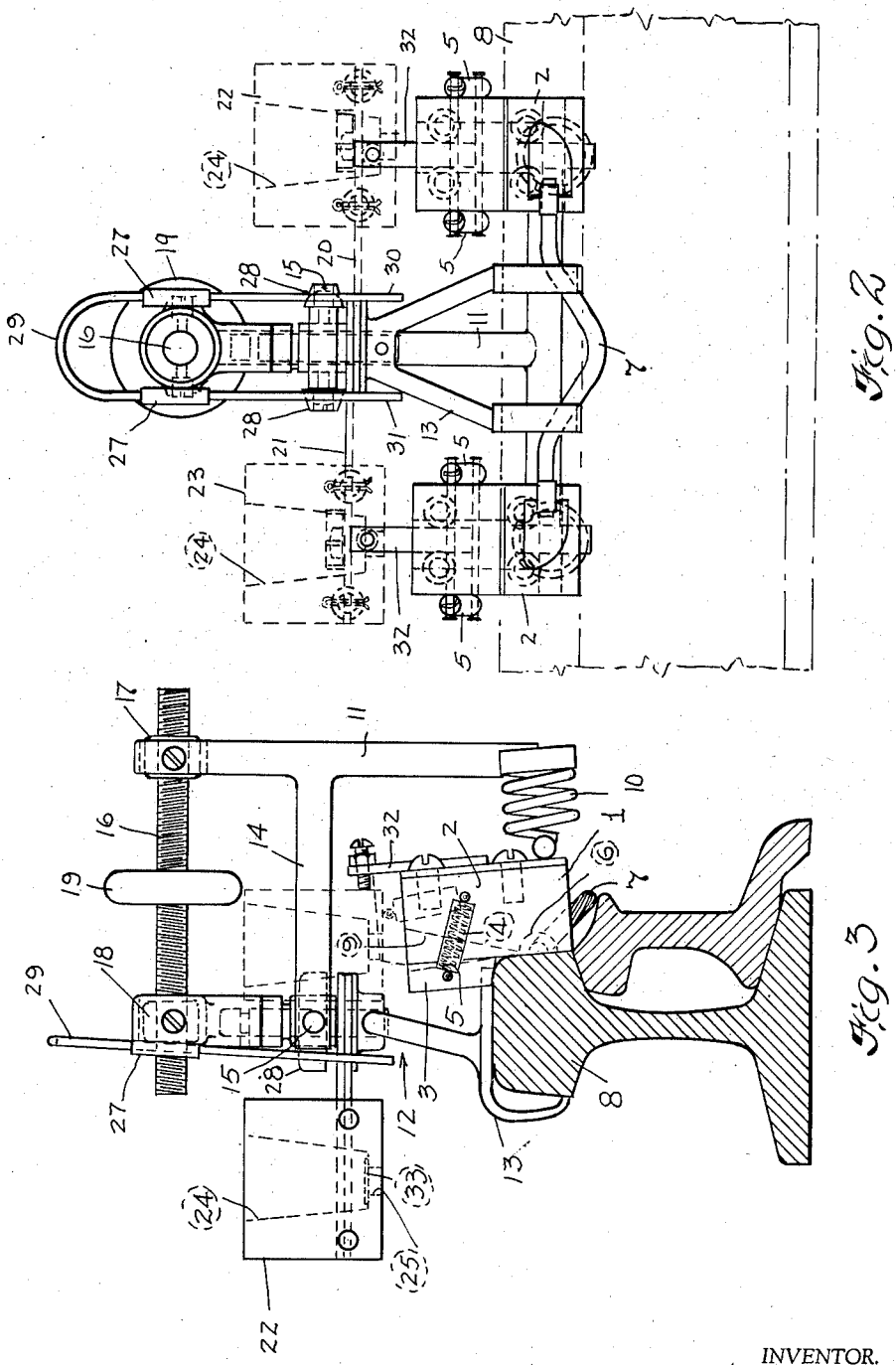

April 22, 1941.  C. A. CADWELL  2,238,926
WELDING
Original Filed Oct. 22, 1936  4 Sheets-Sheet 3
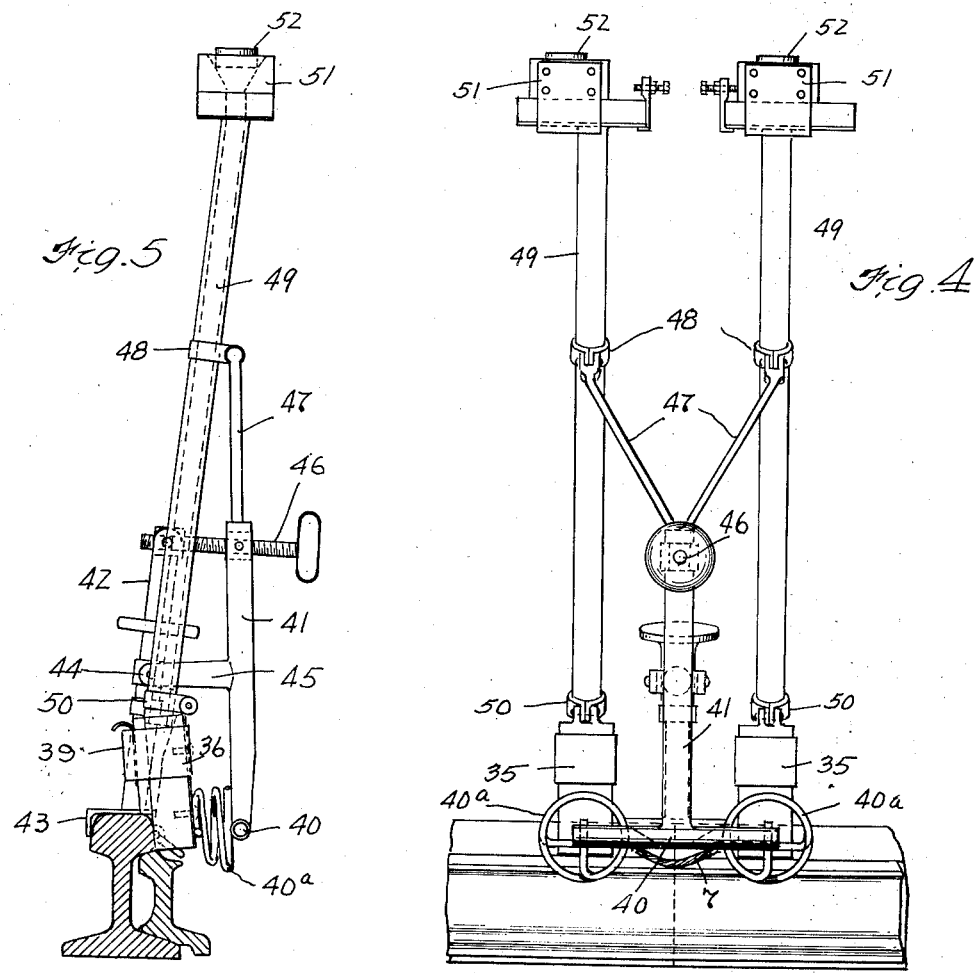
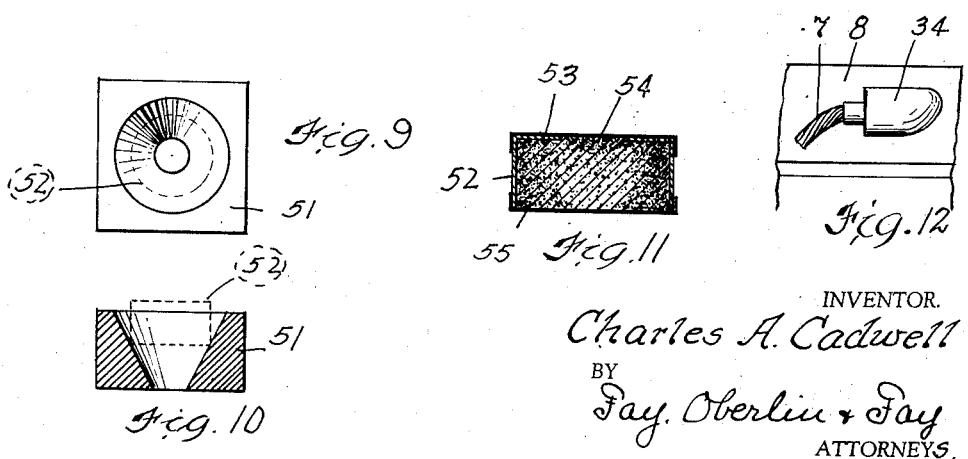
INVENTOR.
Charles A. Cadwell
BY
Fay, Oberlin & Fay
ATTORNEYS.

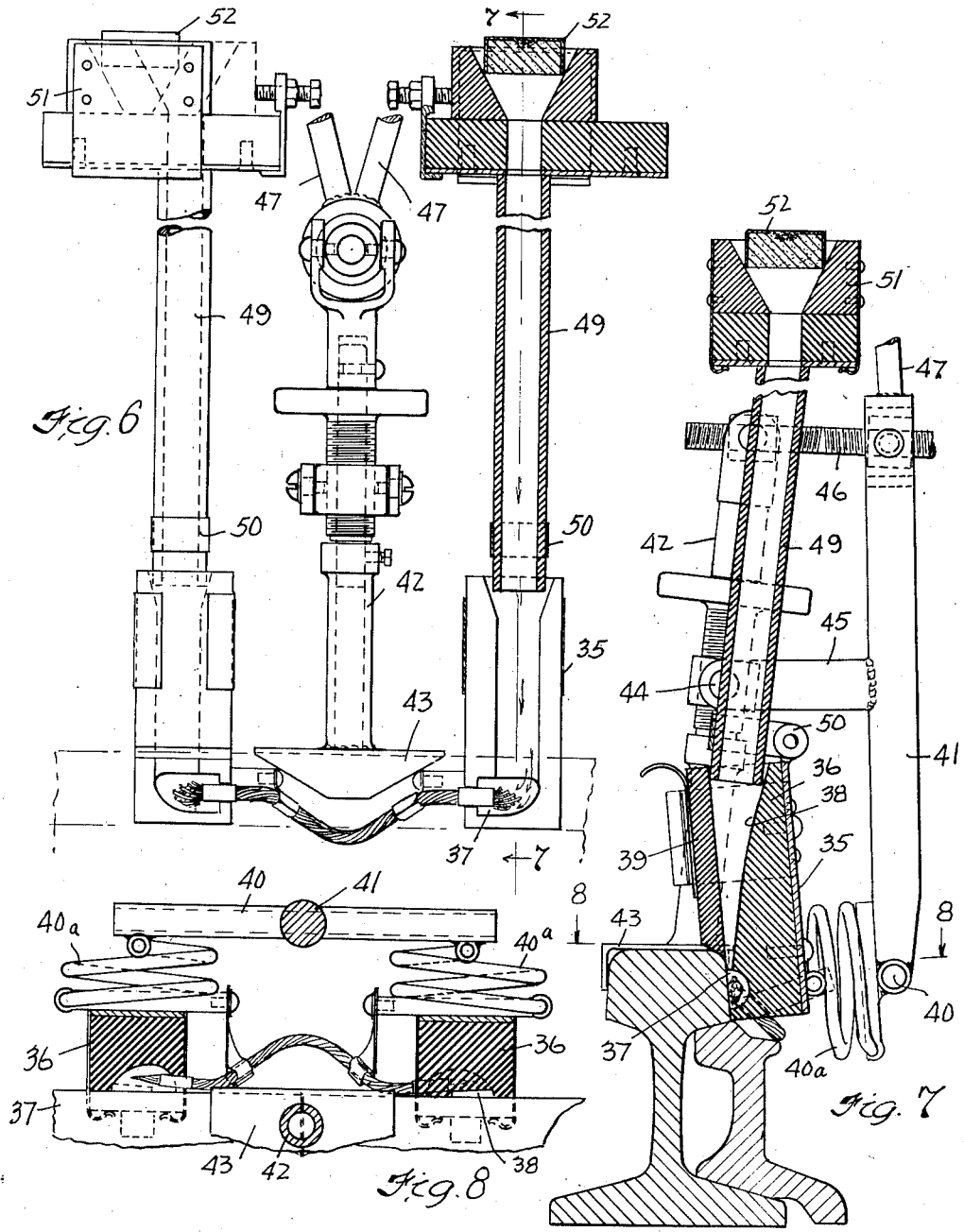

Patented Apr. 22, 1941

2,238,926

UNITED STATES PATENT OFFICE 2,238,926

WELDING

Charles A. Cadwell, Cleveland Heights, Ohio, assignor to The Electric Railway Improvement Company, Cleveland, Ohio, a corporation of Ohio Application October 22, 1936, Serial No. 107,051
Renewed April 19, 1939

2 Claims. (Cl. 22—203)

This invention relates as indicated to welding and more particularly to that process of welding wherein the weld metal is produced by means of an exothermic reaction between a compounded metal and some strong reducing agent such as aluminum.

More specifically, this invention relates to a new and improved method of and apparatus for securing rail bond conductors to rails utilizing the above described form of welding operation to the production of an improved connection, both from a physical, as well as an electrical standpoint between the rail bond and the rail. Certain aspects of this invention disclosed but not claimed herein are disclosed and claimed in my co-pending applications Serial No. 243,351 filed December 1, 1938, Serial No. 370,015 filed December 13, 1940 and Serial No. 374,229 filed January 13, 1941.

I am aware of the fact that workers in the prior art, as represented, for example, by the disclosure in U. S. Patent No. 1,007,005, have attempted to utilize metal produced by means of an exothermic reaction for attaching rail bond conductors to rails; however, such practice has not attained any commercial success due, it is believed, primarily to the fact that such prior art practices have generally resulted in a bond structure defective either from the standpoint of mechanical strength or electrical conductivity, or both. The difficulty in providing a sound bond by the process under consideration is generally due to the fact that a stranded conductor body formed of copper is attempted to be attached to the solid body of the rail formed of steel. In other words, one of the elements is a more or less loose bundle of separate wires of relatively high thermal conductivity and the other member is a solid body of considerably lower thermal conductivity. The fact that a proper electrical bond or connection should be established between each of the individual strands of the conductor body and the body of the rail proper is perhaps as great a difficulty as any to be overcome in providing a bond between the conductor body and the rail which has the required electrical conductivity in addition to the necessary physical strength.

It is, therefore, a principal object of my invention to provide a method of and apparatus for attaching rail bond conductors to rails, overcoming the principal difficulties above enumerated and resulting in an entirely satisfactory bond which may be produced economically and with such facility as to make the process usable commercially.

It is a further object of my invention to provide an apparatus for use in connection with the process comprising my invention, which apparatus is characterized by its relative simplicity and accordingly, its ease of manipulation and the fact that it is readily portable and thus capable of ready manual manipulation in practice.

Other objects of my invention will appear as the description proceeds.

To the accomplishment of the foregoing and related ends, said invention, then consists of the means hereinafter fully described and particularly pointed out in the claims; the annexed drawings and the following description setting forth in detail certain means and one mode illustrating, however, but one of the various ways in which the principle of the invention may be used.

In said annexed drawings:

Fig. 1 is a plan view of the preferred form of apparatus constructed in accordance with the principles of my invention; Fig. 2 is a front elevational view of such apparatus showing the same mounted in position on a rail; Fig. 3 is a side elevational view showing the supporting rail in section of the apparatus illustrated in Figs. 1 and 2; Fig. 4 is a side elevational view of a modified form of apparatus constructed in accordance with my invention; Fig. 5 is a side elevational view of the apparatus illustrated in Fig. 4; Fig. 6 is a broken, part sectional, part side elevational view of the apparatus illustrated in Figs. 4 and 5; Fig. 7 is a transverse sectional view of the apparatus illustrated in Fig. 6 taken on a plane substantially indicated by the line 7—7; Fig. 8 is a transverse sectional view of the apparatus illustrated in Fig. 7 taken on a plane substantially indicated by the line 8—8; Figs. 9 and 10 are respectively plan and section views showing a form of crucible which may be employed in conjunction with the apparatus illustrated in the previous figures; Fig. 11 is a transverse sectional view of a package containing a charge of exothermic powder usable in conjunction with the method and apparatus of this invention; Fig. 12 is a fragmentary side elevational view showing the type of connection between the rail bond and the rail resulting from the method and apparatus of my invention; Fig. 13 is an end elevation of yet another form of apparatus constructed in accordance with the principles of my invention; and Fig. 14 is a side view of the apparatus shown in Fig. 13.

Broadly stated, this invention comprises the provision of a new method of welding, as previously explained, characterized by the use of a particular type of composition capable by means of an exothermic reaction to provide the welding metal. This invention also comprises a novel method of introducing the weld metal to the rail and the bond conductor terminal desired to be attached thereto so that upon solidification of the weld metal, a superior type of connection will result. Further, as above indicated, this invention also comprises the provision of an improved form of apparatus for carrying out the process as above explained.

Referring now more specifically to the drawings and more especially to Figs. 1, 2 and 3, the apparatus illustrated in these figures as above indicated, is one of the preferred embodiments of the means for carrying out the process comprising my invention. Such apparatus, as most clearly illustrated in Fig. 3, comprises a mold generally indicated at 1 which consists of a main body 2 and an auxiliary gate member 3, the latter being resiliently secured to the former by means of springs such as 4 mounted on opposite sides thereof, attached at its opposite ends to the members 2 and 3 respectively and enclosed in a suitable jacket such as 5 which precludes the spring from being damaged in the event molten metal should accidently come in contact therewith.

On the matrix face of the main mold body 2 there is provided a cavity 6 adapted to receive the terminal of the bond 7 which is to be attached to the rail 8. The exact form of such cavity may vary according to the particular type of bond; however, a certain relationship between such cavity and the pouring sprue 9 should be maintained according to the particulars hereinafter more fully explained. It will be noted that the pouring sprue 9 is formed as an open channel on the matrix face of the main mold section 2 and closed by the removable gate 3. The gate 3, i. e., one side of the pouring sprue 9, is made removable in order to facilitate removal of the mold from the rail after the welding operation so that the metal remaining in the pouring sprue may be conveniently removed by chipping or the like from the main body of the bond terminal after the completion of the welding operation.

The mold 1 is secured by some suitable resilient means such as a spring 10 to the lower end of a fulcrum arm 11. A second fulcrum arm, generally indicated at 12, is, at its lower end, provided with a clamping foot 13 adapted to engage the head and a face of the rail opposite to that engaged by the mold 1. A lateral extending arm 14 pivotally connects the fulcrum arms 11 and 12 through the medium of the pivotal connection at 15. Extending between the upper ends of the fulcrum arms 11 and 12 is a screw member 16 having oppositely pitched threads on its opposite ends which are respectively engaged in threaded blocks 17 and 18 pivotally supported on fulcrum arms 11 and 12. Intermediately of its ends the screw member 16 is provided with a hand-wheel 19 whereby it may be conveniently rotated in either direction to selectively move the upper ends of the fulcrum arms towards and away from each other and to correspondingly unclamp and clamp the mold 1 against the face of the rail.

Swingingly mounted on the fulcrum arm 12 are arms 20 and 21 respectively at their outer ends carrying crucibles 22 and 23. These crucibles are preferably formed of some suitable refractory material such as graphite and provided with a central recess such as 24 and an opening 25 extending through the bottom thereof. The crucibles are, as most clearly illustrated in Fig. 1, preferably formed in two sections A and B, the former being fixedly secured to the arms 20 and 21 by means of pins such as 25 and the sections B slidably mounted on such pins so that the sections of the crucible may be separated as illustrated in Fig. 1 to permit the removal therefrom of the slag usually resulting from the exothermic reaction. The spring members 26 are mounted on each of the arms 20 and 21 and so arranged as to normally urge the sections B into engagement with the sections A.

Carried by the fulcrum arms 12 is a U-shaped latch member generally indicated at 29, the lower ends 30 and 31 of which are respectively adapted to be moved into and out of the path of movement of the arms 20 and 21 to retain the latter either in the open position as illustrated in full lines in Fig. 1 or in the closed position as illustrated by the dotted lines in Fig. 1.

It will be noted that the form of apparatus illustrated in Figs. 1 to 3 comprises two molds respectively supported on opposite sides at the lower end of the fulcrum arm 11 and in such spaced relation that the opposite ends of the rail bond 7 may be simultaneously clamped and in such position welded to the rail 8.

The operation of the apparatus illustrated in Figs. 1 to 3 may be briefly described as follows: With the parts occupying the position illustrated in full lines in Fig. 1, the latch 29 is first elevated permitting the arms 20 and 21 to swing into the dotted line position illustrated in Fig. 1 until the crucibles move against the adjustable stop 32 as most clearly illustrated in Fig. 3. The springs 26 maintain the crucible sections B in engagement with the sections A and when so positioned a metallic plug or gate 33 is placed over the outlet opening 25 in each crucible. The foregoing sequence of events occurs, of course, subsequent to a proper positioning of the apparatus on the rail and the placing of the signal bond with its opposite ends in the spaced molds as illustrated in Figs. 1 and 2.

A charge of material preferably of the composition hereinafter more fully explained is then deposited in each of the crucibles and ignited whereupon the exothermic reaction thereof results in the formation of a mass of very highly heated molten copper in the bottom of which crucible, the molten metal resulting from the exothermic reaction in each crucible melts the plug or gate 33 in the bottom of each crucible permitting the molten metal to drop through the pouring sprue 9 into the cavity 6 in the manner hereinafter more particularly explained, thus filling such cavity and upon subsequent cooling, provides a solid terminal bond 34, as most clearly illustrated in Fig. 12 between the stranded body 7 and the rail 8.

The apparatus illustrated in Figs. 4 to 8 is generally similar to that illustrated in Figs. 1, 2 and 3 excepting that the crucibles within which the exothermic reaction takes place are positioned at a substantial elevation above the mold for the purpose hereinafter more fully explained.

Referring now more specifically to Figs. 4 to 8 inclusive the apparatus herein illustrated comprises paired molds generally indicated at 35 which include a main mold body 36 provided on its matrix face with a mold cavity 37 and a pouring sprue 38 leading upwardly therefrom. The pouring sprue 38 is laterally closed by means of a removable gate 39.

The paired molds 35 are supported on the oppositely directed extensions 40 on the lower end of the fulcrum arm 41. The second fulcrum arm 42 is provided at its lower end with a rail-engaging foot 43 and is intermediately of its ends pivotally connected as at 44 to the lateral extending arm 45 on the fulcrum arm 41. Between their upper ends fulcrum arms 41 and 42 are provided with a screw 46 threaded in opposite directions at its opposite ends, the function and operation of which is similar to the screw 16 previously described in connection with Figs. 1 and 3.

As most clearly illustrated in Figs. 4 and 5, the fulcrum arm 41 is provided with upwardly extending arms 47 which, at their upper ends, carry collars 48 within which are mounted vertically extending tubes 49. The tubes 49 are, at their lower ends, secured in collars 50 carried by the upper portions of the molds 35.

Mounted on top of the tubes 49 are crucibles 51 within which are positioned charges 52 which, upon completion of an exothermic reaction will discharge quantities of very highly heated metal, such as copper, downwardly through the tubes 49, the pouring sprue 38 and into the mold cavity 37. The molds 35, similarly to the molds 1 of the apparatus illustrated in Fig. 1, are resiliently supported by means such as springs 40a on the lateral extensions 40 of the fulcrum arm 41, such springs assisting in equalizing the pressure by means of which the two molds are respectively clamped to the face of the rail. The function and operation of the apparatus illustrated in Figs. 4 to 8 inclusive is generally similar to that of the apparatus illustrated in Figs. 1 to 3. The principal difference being, as above indicated, that in the apparatus illustrated in Fig. 4, for example, the crucibles wherein the exothermic reaction takes place are at a considerably greater elevation above the molds than in the apparatus illustrated, for example, in Fig. 1. This elevation of the crucibles is desirable for certain types of operation since the metal formed by the exothermic reaction in dropping downwardly through the tubes 49 attains a sufficient velocity to impinge with a considerably greater force against the rail and the rail bond terminal than in the apparatus illustrated in Figs. 1 to 3. This acceleration of the weld metal prior to its introduction to the mold cavity may be found advantageous for certain types of bond and particularly where it is desired to insure that the weld metal will be forced into every recess not only of the relatively narrow confines of the mold cavity but also between the strands on the end of the bond.

The manner in which the mold cavities and the pouring sprues associated therewith are related, not only to each other, but also to the end of the bond being operated upon, is preferably the same in the various forms of apparatus illustrated and is most clearly shown in Fig. 6. In this last-named figure it will be noted that the pouring sprue enters the mold cavity proper at such a position and in such a direction that the incoming highly heated weld metal resulting from the exothermic reaction flows in the mold cavity in a direction substantially axially counter to the end of the stranded conductor and also at an angle to the face of the rail to which the conductor is to be secured. It has been found that this direction of flow of the weld metal in the mold is particularly effective in insuring that the weld metal which forms the bond between the stranded conductor and the rail properly flows around and thus engages and makes electrical contact with each of the strands of the conductor. In order to facilitate such action the end of the stranded conductor may be broomed out at least slightly, likewise as illustrated in Fig. 6.

It is desirable that the weld metal, as it flows into the mold cavity, impinge at least at a slight angle against the face of the rail to which the bond is to be secured. Such impingement of the molten weld metal against the rail face, as well as the stranded conductor, as previously explained, improves the atomic union between the weld metal and the two elements which are sought to be joined.

Another form of apparatus constructed in accordance with the principles of my invention and designed particularly for use in conjunction with a certain type of conductor characterized by being generally larger than those with which the apparatus shown in Fig. 1, for example, is employed, is shown in Figs. 13 and 14. The principal difference between the construction illustrated in these last-named figures and that shown in Fig. 1 resides in the mold or molds generally indicated at 2a. The mold 2a is resiliently supported by means of the spring on a fulcrum arm in substantially the same manner as in the apparatus shown in Fig. 1 so that like reference characters will be employed to designate like parts.

The mold 2a formed of some suitable refractory material such as graphite is divided into two sections 2b and 2c respectively, as most clearly illustrated in Fig. 14. Sections 2b and 2c of the mold are provided with axially aligned oppositely threaded openings in which is positioned a screw 3b and by which the mold sections may be clamped together or separated as desired.

The mold cavity generally indicated at 4b is different from the mold cavities of the previously described forms of construction in that the cavity in the apparatus illustrated in Figs. 13 and 14 is so formed that when the mold sections 2b and 2c are brought together by the screw 3b the end of the stranded conductor 7a extends towards the face of the rail to which it is to be attached in a plane substantially normal to such face. With the mold cavity 4b formed in this manner, it is not necessary to provide a separate gate defining a pouring sprue, since the upper end of the mold cavity 4b is merely left open and serves as the opening through which the highly heated metal is introduced into the mold cavity and in a direction substantially axially opposed to the end of the conductor 7a.

The construction of the mold sections as shown in Figs. 13 and 14 is, as previously indicated, particularly desirable for use in conjunction with a relatively large conductor, since when the conductor end is positioned in the manner illustrated in Fig. 13, the highly heated metal has a better opportunity to flow around the end of the conductor and thus establish the proper physical and electrical connection between the conductor and the rail.

The fact that the upper end of the mold cavity is open is also advantageous in that any excess metal resulting from the exothermic charge employed to generate the welding metal will flow laterally away from the mold opening instead of building up as a column in a pouring sprue, thus reducing to a minimum the trimming necessary after the casting operation has been completed.

In the light of the foregoing it will be noted that my invention contemplates the arrangement of the conductor end with respect to the rail to which it is to be secured in a wide variety of ways, depending upon the size and character of the conductor. All of these modifications have, however, a common characteristic in that the highly heated metal from which the bond between the conductor and the rail is formed is introduced to the end of the conductor in a direction substantially axially counter thereto.

In Fig. 11, there is illustrated a cartridge 51 or package charge of the material used in accordance with my invention in providing the weld metal. When such cartridge is employed, it will preferably be positioned in a crucible such as is generally illustrated in Figs. 9 and 10 and which has a conical inner surface. It has been observed in actual use that a crucible having the type of inner surface illustrated in Figs. 9 and 10, insures a better progression of the exothermic reaction than a crucible having straight sides.

The cartridge 51 illustrated in Fig. 11 comprises side walls of some suitable material such as strawboard or the like with the top and bottom formed of a thinner material such as, for example, Cellophane. The charge, generally indicated at 53, is preferably more firmly packed around the outside of the container than in the center since it has been found that the igniting powder 54 shown positioned centrally of the charge at the top of the container, when ignited, sets off the charge in a more efficient and more uniform manner than when the central portion of the charge is as tightly packed as the remainder.

As previously indicated, the top of the carton should preferably be of some thin material so that it may be readily broken when it is desired to ignite the igniting powder 54. The bottom 55 of the carton or container for the charge is preferably formed of some material which will either melt or decompose upon pyrolysis, during or preferably upon the completion of the exothermic reaction and without liberating any substantial amount of gas since it has been found that when the bottom of the carton is made of some material such as strawboard, the combustion of the same results in the generation of such volumes of gas as to tend to blow the charge upwardly out of the crucible. The bottom 55 of the container, as above indicated, may be formed of some suitable organic material such as Cellophane which has sufficient strength but which will burn and permit the charge to drop out of the bottom of the container without the generation of objectionable amounts of gas. It is to be noted that it is also within the contemplation of my invention to provide the bottom 55 of the container with some suitable material as a thin metallic sheet formed of either ferrous or non-ferrous material which will merely melt without the generation of any gas and permit the heated charge to drop downwardly therethrough.

I have also provided an improved mixture of components which, upon ignition, will proceed through an exothermic reaction to the production of the desired quantity and quality of weld metal for use in the process comprising my invention. A table giving the composition and proportion of such mixture is as follows:

| | Parts by weight |
|---|---|
| Copper oxide (roasted copper mill scale) | From about 30 to about 50 |
| Copper-aluminum alloy | From about 14 to about 20 |
| Tin oxide | From about .75 to about 2 |
| Zinc oxide | From about .4 to about 1 |
| Manganese dioxide | From about .4 to about 1 |

As above indicated, the oxide of copper forming the principal constituent of the mixture and from which the principal volume of the resultant weld metal is derived is preferably in the form of roasted copper rolling mill scale. This metal scale is composed of flat scales of various size and varying degrees of oxidation. The finer particles are black in color which indicate a higher degree of oxidation than occurs in the larger scales of red color. It is understood, of course, that while the metal scale is desired and has been found highly satisfactory both from the standpoint of its operation as well as its cost, pure $Cu_2O$ may be employed.

The copper-aluminum alloy referred to in the foregoing table may contain from about 50% to about 70% copper and from about 50% to about 30% aluminum, the preferred composition being about 65% copper and about 35% aluminum. If the aluminum were present in granulated form, the rate of reaction of the same with the copper oxide in the reduction of the latter during the exothermic reaction would proceed at such a rapid rate that the mixture during the course of the reaction would be blown out of the crucible. However, the use of this crushed or finely divided copper-aluminum alloy, instead of granulated aluminum as the reducing agent, reduces the violence of the reaction and adds volume to the molten copper resulting from the exothermic reaction while permitting the reaction to proceed at a sufficient rate to maintain the proper temperature necessary for the production of the molten welding metal.

In the foregoing table it should be noted that the tin oxide, the zinc oxide and the manganese dioxide are all added in accordance with the usual principles under which these elements are added to insure a soundness of the weld metal. Obviously, their proportional relationship may be changed if found necessary under particular conditions in order to increase the soundness of the metal.

A specific example of a mixture found very satisfactory for use in accordance with my invention is as follows:—

| | | |
|---|---|---|
| Copper mill scale | grams | 45 |
| Copper-aluminum alloy | do | 17.5 |
| Tin oxide | do | 1 |
| Zinc oxide | do | ½ |
| Red phosphorus | milligrams | 200 |
| Metallic manganese | do | 200 |

The copper mill scale, as well as the copper-aluminum alloy will preferably be in such finely divided form as will pass through a 28 mesh screen and be retained on a 100 mesh screen. The metallic manganese will be of such a fineness as will pass through an 80 mesh screen.

The foregoing mixture does not ignite very readily, so that it is desirable to employ in conjunction with each charge a small quantity of an igniting powder wihch may be conveniently placed on top of the charge ignited with a match and which may, for example, contain the following:—

| | Parts by weight |
|---|---|
| Copper oxide scale | 20 |
| Copper-aluminum alloy | 5 |
| Red phosphorus | 5 |
| Metallic aluminum powder | 7.5 |
| Black copper oxide | 10 |

The exothermic charge may be poured into the crucible and compacted to induce speed and uniform spread of the reaction with a small amount of the ignition powder placed on top of the same and then fired with a match. It will be found, however, that when the charges are carefully weighed out and packaged, i. e., provided in the form illustrated in Fig. 11 of the drawings, that not only will time be saved in the field but if the charge is accurately weighed out and packaged, there will be greater assurance that exactly the right amount of the charge will be employed as required to produce the amount of weld metal necessary to properly fill the mold cavity.

While the above described invention has been explained by having particular reference to the process of joining a bond to a rail, it will be noted, however, that this invention is applicable to other uses than the one described such as, for example, in bonding the blades to the base in an ordinary electric knife switch.

Instead of bonding the stranded conductor directly to the rail as explained, my invention may, of course, be employed in bonding the stranded conductor to a steel plate or similar terminal member, which terminal member is then secured by any suitable means to the steel rail.

Other modes of applying the principle of my invention may be employed instead of the one explained, change being made as regards the means and the steps herein disclosed, provided those stated by any of the following claims or their equivalent be employed.

I, therefore, particularly point out and distinctly claim as my invention:

1. The method of joining the conductor of a rail bond to a rail which comprises holding said conductor in place by means of a suitable mold clamped against a surface of said rail and provided with an open cavity facing the rail and in which the end of said conductor is positioned and then filling said cavity by means of a stream of heated metal, the direction of flow of said stream of metal in said cavity being towards the said end of said conductor and in substantial alignment with the axis thereof.

2. The method of joining the conductor of a rail bond to a rail which comprises holding said conductor in place by means of a suitable mold clamped against a surface of the rail and provided with an open cavity facing the rail and in which the end of said terminal is positioned and then by means of an exothermic reaction generating a charge of highly heated metal and filling said cavity by means of said charge, the molten metal flowing in a stream into said cavity in a direction towards the end of said conductor and in substantial axial alignment therewith.

CHARLES A. CADWELL.